(12) United States Patent  
Lehtiniemi et al.

(10) Patent No.: US 10,425,761 B2  
(45) Date of Patent: Sep. 24, 2019

(54) AUDIO VOLUME HANDLING

(71) Applicant: Nokia Technologies Oy, Espoo (FI)

(72) Inventors: Arto Lehtiniemi, Lempäälä (FI); Antti Eronen, Tampere (FI); Jussi Leppänen, Tampere (FI); Juha Arrasvuori, Tampere (FI)

(73) Assignee: Nokia Technologies Oy, Espoo (FI)

( * ) Notice: Subject to any disclaimer, the term of this patent is extended or adjusted under 35 U.S.C. 154(b) by 12 days.

(21) Appl. No.: 15/632,977

(22) Filed: Jun. 26, 2017

(65) Prior Publication Data

US 2018/0007489 A1 Jan. 4, 2018

(30) Foreign Application Priority Data

Jun. 30, 2016 (EP) ..................................... 16177144

(51) Int. Cl.
*H04B 1/00* (2006.01)
*H04R 5/02* (2006.01)
(Continued)

(52) U.S. Cl.
CPC .............. *H04S 7/303* (2013.01); *G06F 3/165* (2013.01); *G06F 3/167* (2013.01); *H04S 7/304* (2013.01);
(Continued)

(58) Field of Classification Search
CPC . H04S 7/30; H04S 7/302; H04S 7/303; H04S 7/304; H04S 2400/11; H04S 2400/13; H04S 2400/15; H04S 2420/01; G06F 3/165; G06F 3/167; H03G 3/00; H03G 3/001; H03G 3/002; H03G 3/3005; H03G 3/32
(Continued)

(56) References Cited

U.S. PATENT DOCUMENTS 8,068,105 B1 * 11/2011 Classen ................. G06T 11/206
345/440
9,690,374 B2 6/2017 Clement et al.
(Continued)

OTHER PUBLICATIONS

"25 Windows Movie Maker Tips and Tricks for Windows 10", Iskysoft, Retrieved on May 1, 2017, Webpage available at : https://www.iskysoft.com/video-editing/windows-movie-maker-tips.html.
(Continued)

*Primary Examiner* — Xu Mei
(74) *Attorney, Agent, or Firm* — Harrington & Smith

(57) ABSTRACT

Apparatus is configured to associate each of one or more spatially-distributed audio sources in a virtual space, each audio source providing one or more audio signals representing audio for playback through a user device, with a respective fade-in profile which defines how audio volume for the audio source is gradually increased from a minimum level to a target volume level as a function of time. It is configured also to identify, based on user position, a current field-of-view within a virtual space and, in response to detecting that one or more new audio sources have a predetermined relationship with respect to the current field-of-view, fading-in the audio from the or each new audio source according to the fade-in profile for the respective audio source so as to increase their volume gradually towards the target volume level defined by the fade-in profile.

18 Claims, 14 Drawing Sheets

(51) Int. Cl.
*H04S 7/00* (2006.01)
*G06F 3/16* (2006.01)

(52) U.S. Cl.
CPC ....... *H04S 2400/11* (2013.01); *H04S 2400/13* (2013.01); *H04S 2400/15* (2013.01); *H04S 2420/01* (2013.01)

(58) Field of Classification Search
USPC ....... 381/303, 309, 310, 104, 107, 109, 119; 369/3
See application file for complete search history.

(56) References Cited

U.S. PATENT DOCUMENTS

| | | | | |
|---|---|---|---|---|
| 9,724,608 | B2* | 8/2017 | Mizuta | ................... H04S 7/307 |
| 2010/0040238 | A1 | 2/2010 | Jang et al. | |
| 2010/0260355 | A1* | 10/2010 | Muraoka | ................ A63F 13/10 |
| | | | | 381/107 |
| 2015/0207478 | A1* | 7/2015 | Duwenhorst | ........ H03G 3/3005 |
| | | | | 381/104 |
| 2016/0085305 | A1 | 3/2016 | Spio | |
| 2017/0046906 | A1* | 2/2017 | Hilbert | ................ G07F 17/3209 |

OTHER PUBLICATIONS

"Sync Tanks", FilmSound.org, Retrieved on May 1, 2017, Webpage available at : http://filmsound.org/synctanks/.

"Sound Design 101: Making Your Film Sound Great", Premiumbeat, Retrieved on May 1, 2017, Webpage available at : https://www.premiumbeat.com/blog/sound-design-101-making-your-film-sound-great/.

"Audio for Video: 5 EQ Tips for Filmmakers", Vashivisuals, Retrieved on May 1, 2017, Webpage available at : http://vashivisuals.com/5-eq-audio-for-video-tips-for-filmmakers/.

Shah et al., "Metrics for Measuring Ideation Effectiveness", Design Studies, vol. 24, No. 2, Mar. 2003, pp. 111-134.

Smith., "Idea-Generation Techniques: A Formulary of Active Ingredients", Journal of creative behavior, vol. 32, No. 2, Jun. 1998, pp. 107-133.

Smith, "Towards a logic of innovation", The International Handbook on Innovation, Dec. 2003. pp. 347-365.

Extended European Search Report received for corresponding European Patent Application No. 16177144.9, dated Dec. 16, 2016, 6 pages.

Amling et al., "Acoustical Zooming Based on a ParametricSound Field Representation", Audio Engineering Society, May 22-25, 2010, pp. 1-9.

* cited by examiner

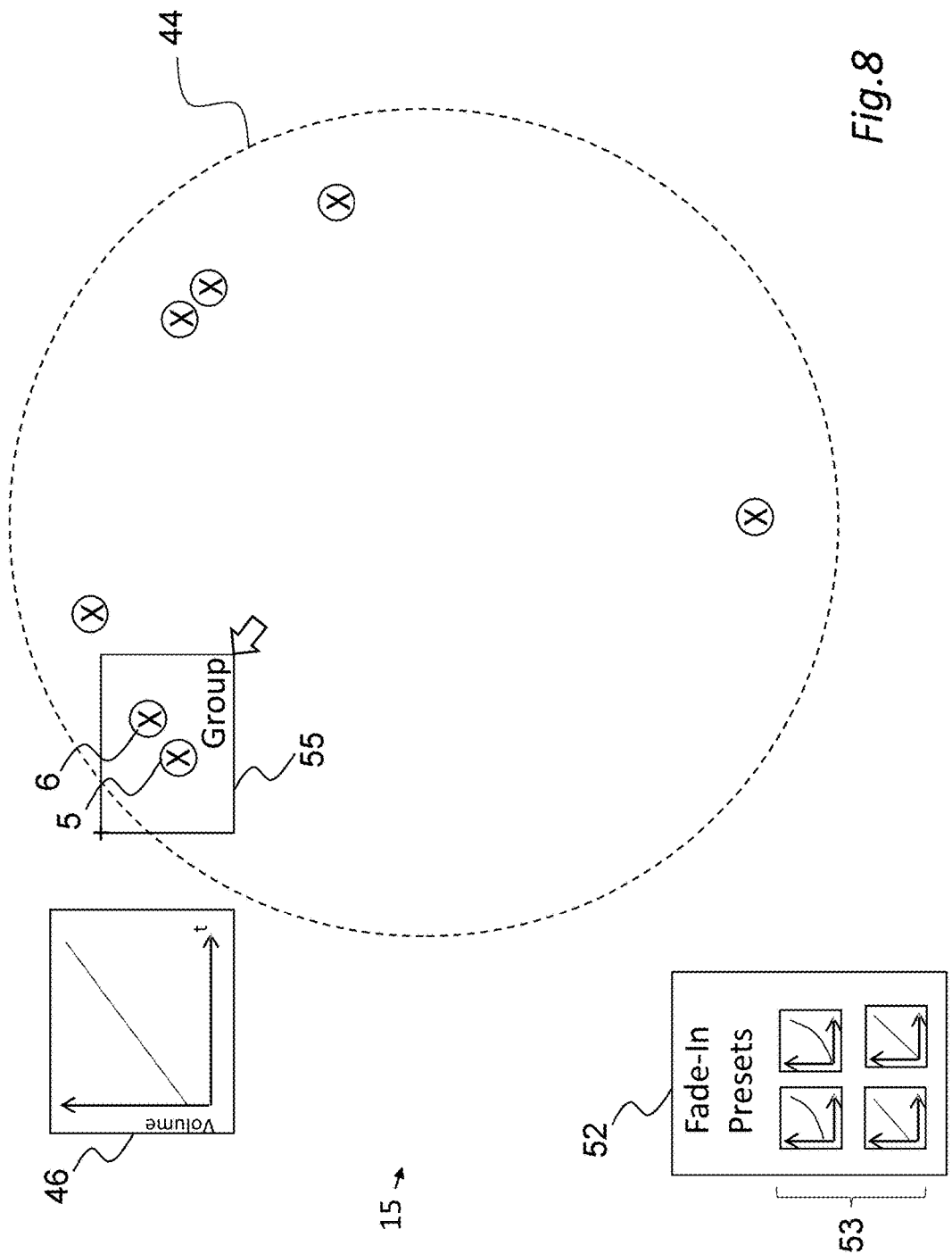

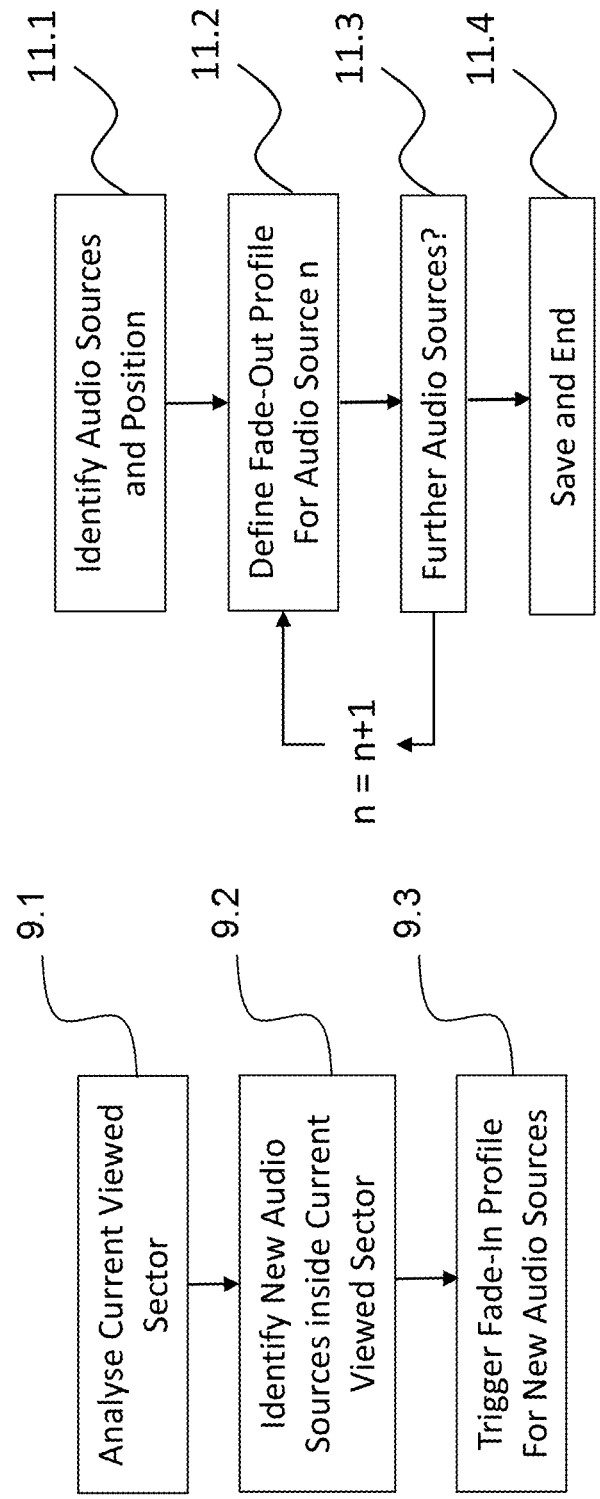

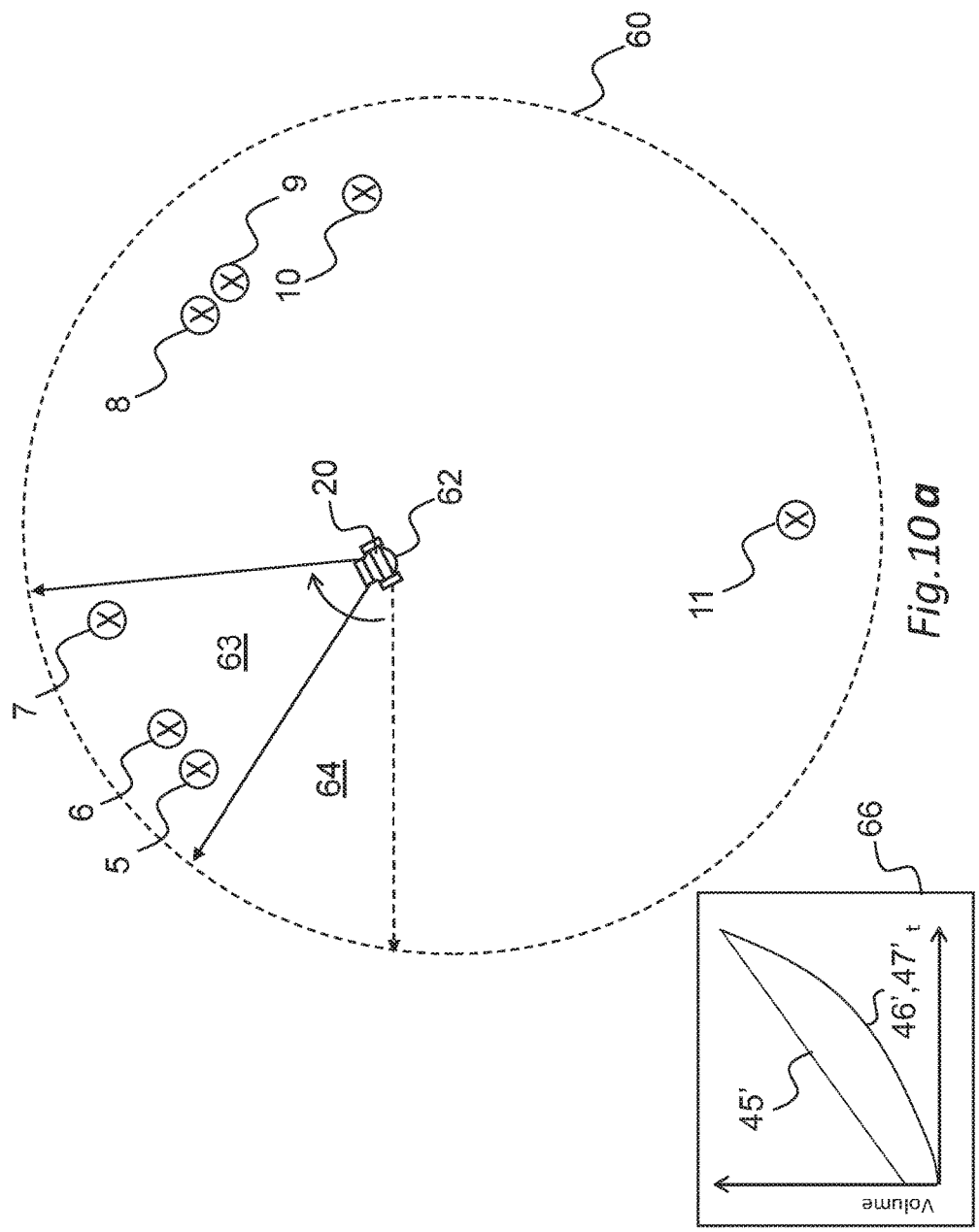

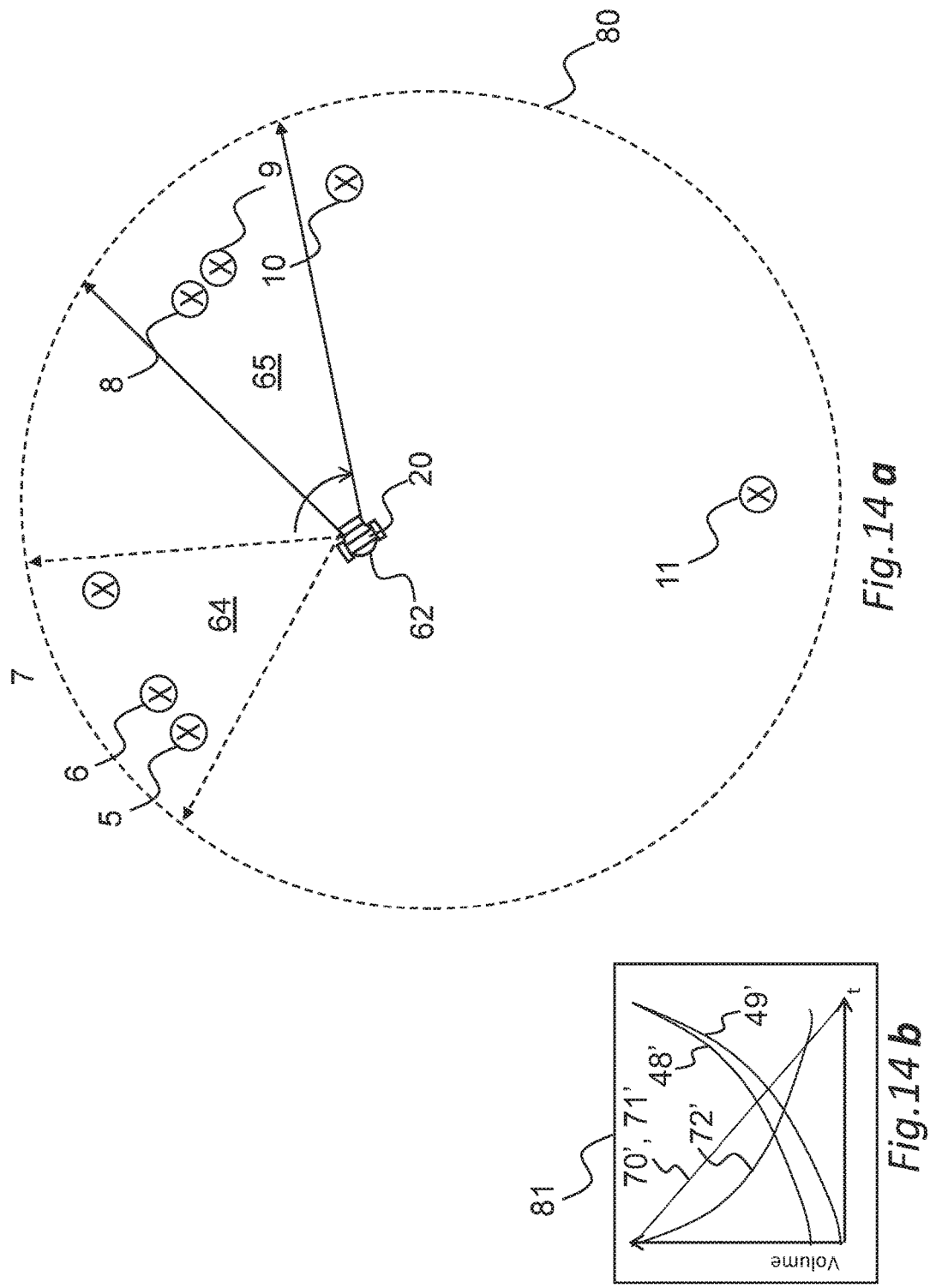

AUDIO VOLUME HANDLING

FIELD

This specification relates to audio volume handling, for instance in immersive multimedia. This specification relates, but is not limited to, audio processing for modifying how audio signals for one or more audio sources are played back during the user consumption phase of a virtual environment.

BACKGROUND

Virtual reality (VR) is an example of an immersive multimedia which involves displaying a virtual world within a user device, typically a headset worn by the user which has two screens (one for each eye) displaying part of the virtual world dependent on the position and orientation of the user detected using sensors. Headphones are also provided in the headset providing audio thereby adding to the virtual experience. The virtual world may be computer-generated from a real world space captured using a suitable camera and microphone system comprising an array of camera sensors and microphones oriented in respective directions. Nokia's OZO® device is one such capture device, providing both spatial video and audio signals for processing and rendering using suitable VR software on a computer system.

Spatial audio refers to playable audio data that exploits sound localisation. In a real world space there may be multiple audio sources. The location and movement of the audio sources is a parameter of the captured audio. In rendering the audio as spatial audio for playback such parameters are incorporated in the data using processing algorithms so that the listener is provided with an immersive and spatially oriented experience. Nokia's Spatial Audio Capture (SPAC) is an example technology for processing audio captured via a microphone array into spatial audio; that is audio with a spatial percept. Alternatively, or additionally, object-based audio can be created based using signals from a plurality of close-up microphones each of which is associated with a respective audio source in the real-world space the position of which can be determined. In both cases, the intention is to capture audio so that when it is rendered to a user the user will experience the sound field as if they are present at the location of the capture device.

A mixing phase of VR is when a creator, e.g. a director, makes certain changes to the captured video and/or audio data to create a desired user experience. A rendering phase of VR is when the captured and mixed data is made available in a form ready for consumption and interaction. A consumption phase of VR is when the user is viewing and/or listening to the virtual world content, e.g. when wearing a VR headset.

In the consumption phase of VR, or indeed any virtual space in which the audio has a spatial percept, the presence of multiple audio sources may overwhelm the user and/or may make it difficult to understand the immersive experience that the director intended to convey.

SUMMARY

A first aspect of this specification provides a method comprising:
 associating each of one or more spatially-distributed audio sources in a virtual space, each audio source providing one or more audio signals representing audio for playback through a user device, with a respective fade-in profile which defines how audio volume for the audio source is gradually increased from a minimum level to a target volume level as a function of time.

The method may comprise:
 identifying, based on user position, a current field-of-view within a virtual space; and
 responsive to detecting that one or more new audio sources have a predetermined relationship with respect to the current field-of-view, fading-in the audio from the or each new audio source according to the fade-in profile for the respective audio source so as to increase their volume gradually towards the target volume level defined by the fade-in profile.

The one or more new audio sources may be detected responsive to the current field-of-view changing due to a change in user position from a previous field-of-view in which the new audio sources were not present.

The one or more new audio sources may be detected responsive to them moving within the virtual space from outside to inside the current field-of-view.

The fade-in profile may define how the volume for the audio source is increased from between a minimum level and the target volume level as a function of time. One or more fade-in profiles may define a non-zero minimum level and/or one or more fade-in profiles may define a non-linear rate of increase between the minimum and the target volume level.

A plurality of audio sources provided in the virtual space may have different respective fade-in profiles, and/or one or more groups each comprising plural audio sources may be provided in the virtual space, wherein the audio sources within a group having a common fade-in profile associated therewith.

The method may comprise: fading-out the audio from the one or more new audio source so as to decrease their volume responsive to detecting said sources leaving the current field-of-view.

The fading-out may be performed using a predetermined fade-out profile associated with the or each audio source, which fade-out profile defines how the volume for the audio source is decreased from between a first level and a minimum volume level as a function of time.

The method may comprise: receiving movement data representing spatial movement of the one or more new audio sources relative to the field-of-view, and filtering the spatial movement of the one or more new audio sources whilst their corresponding audio is being faded-in.

Said filtering may be performed using a predetermined movement profile associated with the or each new audio source, which movement profile defines how movement is increased from between a minimum and a target movement level over time.

The movement profile may define a substantially linear scaling of movement.

A second aspect provides a computer program comprising instructions that when executed by a computer apparatus control it to perform the method of any preceding claim.

A third aspect provides apparatus configured to perform any method above.

A fourth aspect provides apparatus comprising:
 means for associating each of one or more spatially-distributed audio sources in a virtual space, each audio source providing one or more audio signals representing audio for playback through a user device, with a respective fade-in profile which defines how audio volume for the audio source is gradually increased from a minimum level to a target volume level as a function of time.

The apparatus may comprise:
means for identifying, based on user position, a current field-of-view within a virtual space; and
means for responsive to detecting that one or more new audio sources have a predetermined relationship with respect to the current field-of-view, fading-in the audio from the or each new audio source according to the fade-in profile for the respective audio source so as to increase their volume gradually towards the target volume level defined by the fade-in profile.

The one or more new audio sources may be detected responsive to the current field-of-view changing due to a change in user position from a previous field-of-view in which the new audio sources were not present.

The one or more new audio sources may be detected responsive to them moving within the virtual space from outside to inside the current field-of-view.

According to a fifth aspect, there is provided a non-transitory computer-readable storage medium is provided having stored thereon computer-readable code, which, when executed by at least one processor, causes the at least one processor to perform:
associating each of one or more spatially-distributed audio sources in a virtual space, each audio source providing one or more audio signals representing audio for playback through a user device, with a respective fade-in profile which defines how audio volume for the audio source is gradually increased from a minimum level to a target volume level as a function of time.

The non-transitory computer-readable storage medium may store computer-readable code which when executed causes the at least one processor to perform:
identifying, based on user position, a current field-of-view within a virtual space; and
responsive to detecting that one or more new audio sources have a predetermined relationship with respect to the current field-of-view, fading-in the audio from the or each new audio source according to the fade-in profile for the respective audio source so as to increase their volume gradually towards the target volume level defined by the fade-in profile.

The non-transitory computer-readable storage medium may store computer-readable code which when executed causes the at least one processor to perform:
detecting the one or more new audio sources responsive to the current field-of-view changing due to a change in user position from a previous field-of-view in which the new audio sources were not present.

The non-transitory computer-readable storage medium may store computer-readable code which when executed causes the at least one processor to perform:
detecting wherein the one or more new audio sources responsive to them moving within the virtual space from outside to inside the current field-of-view.

According to a sixth aspect, apparatus is provided, the apparatus having at least one processor and at least one memory having computer-readable code stored thereon which when executed controls the at least one processor to perform:
associating each of one or more spatially-distributed audio sources in a virtual space, each audio source providing one or more audio signals representing audio for playback through a user device, with a respective fade-in profile which defines how audio volume for the audio source is gradually increased from a minimum level to a target volume level as a function of time.

The computer-readable code when executed may control the at least one processor to perform:
identifying, based on user position, a current field-of-view within a virtual space; and
responsive to detecting that one or more new audio sources have a predetermined relationship with respect to the current field-of-view, fading-in the audio from the or each new audio source according to the fade-in profile for the respective audio source so as to increase their volume gradually towards the target volume level defined by the fade-in profile.

The computer-readable code when executed may control the at least one processor to perform:
detecting the one or more new audio sources responsive to the current field-of-view changing due to a change in user position from a previous field-of-view in which the new audio sources were not present.

The computer-readable code when executed may control the at least one processor to perform:
detecting wherein the one or more new audio sources responsive to them moving within the virtual space from outside to inside the current field-of-view.

BRIEF DESCRIPTION OF THE DRAWINGS

The invention will now be described, by way of non-limiting example, with reference to the accompanying drawings, in which:

FIG. 8 is a schematic view of the FIG. 6 user interface with multiple audio sources being grouped and having a common associated fade-in profile, according to embodiments;

FIG. 9 is a flow diagram showing method steps of applying fade-in profiles for audio sources responsive to user movement, according to embodiments;

FIG. 10a is a top plan view of a user consuming virtual content captured in relation to the FIG. 1 space, in which said user moves position;

FIG. 10b is a graphical view showing overlaid fade-in profiles which result from the user movement in FIG. 10a, according to embodiments;

FIG. 11 is a flow diagram showing method steps of defining audio fade-out profiles for audio sources, according to embodiments;

FIG. 14a is a top plan view of a user consuming virtual content captured in relation to the FIG. 1 space, in which said user moves position;

FIG. 14b is a graphical view showing overlaid fade-in and fade-out profiles which result from the user movement in FIG. 14a, according to embodiments;

DETAILED DESCRIPTION OF EMBODIMENTS

Figure 1:
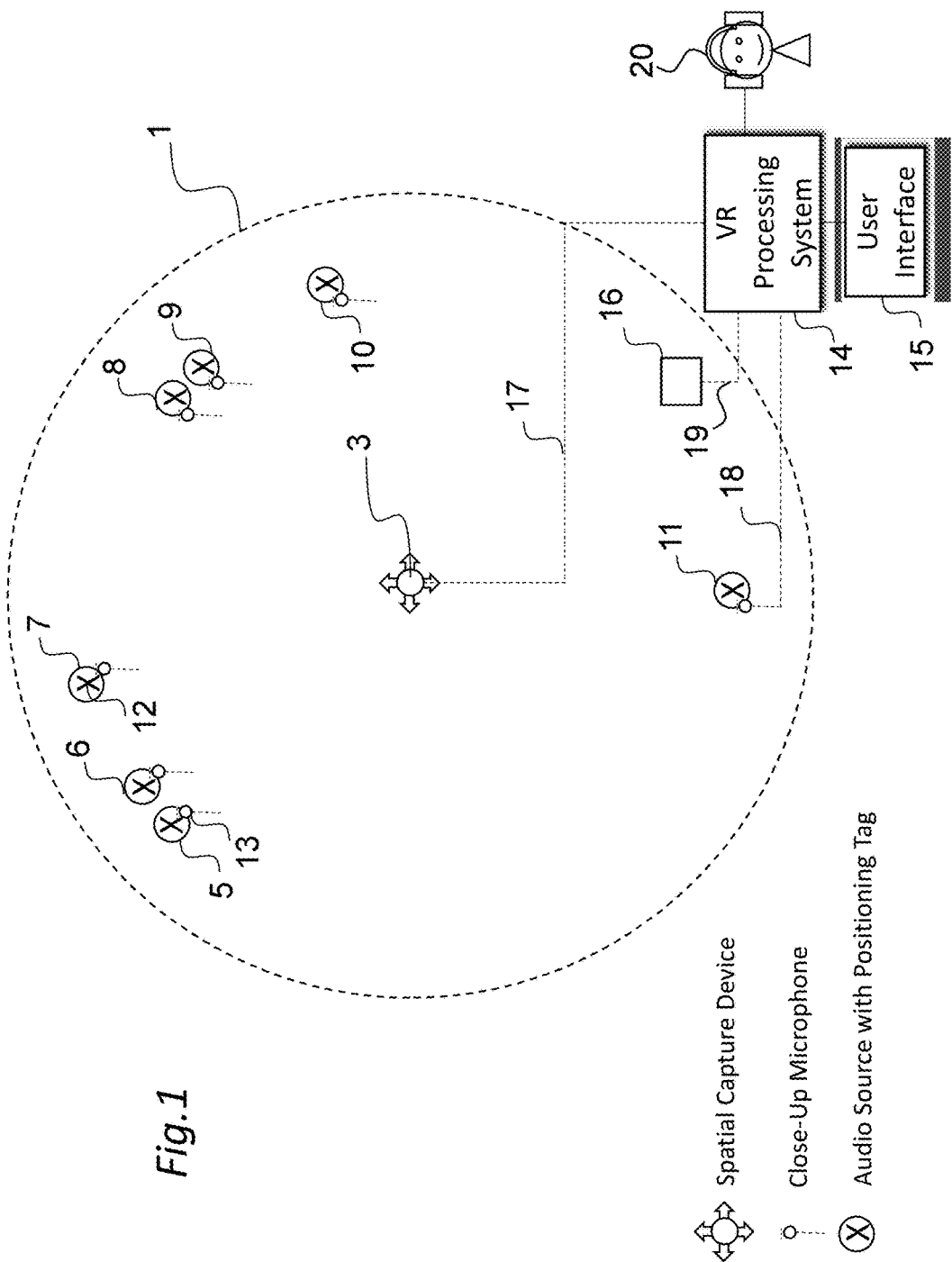
FIG. 1 is a top-plan view of a real world capture situation for creating a virtual reality version, which is useful for understanding embodiments.

Embodiments herein relate to virtual reality (VR) systems, in which a user is provided with a video and audio feed representing a virtual space for immersive output through a headset. It should however be appreciated that the embodiments may be applied to non-video applications and systems whereby only a spatial and/or object-based audio field is captured and provided to a user through a headset, headphones or speakers.

In this context, a virtual space is any computer-generated version of a space, for example a captured real world space, in which a user can be immersed through a visual and/or audio interface device such as is provided in a VR headset.

The Embodiments are also applicable to Presence-Captured (PC) content.

What is presented by the VR system to the user is determined by data signals received from a VR headset indicative of one or more of its spatial position and orientation. For ease of reference, we refer to these signals as position signals or position data. The VR headset incorporates motion tracking sensors which may include gyroscopes, accelerometers and structured light systems. These sensors generate the position data from which a current viewing field-of-view, or sector, is determined and updated as the user changes position, whether through spatial position, orientation and possibly through gaze direction. The VR headset will typically comprise two digital screens for displaying stereoscopic video images of the virtual world in front of respective eyes of the user, and also two speakers for delivering audio from the VR system. The embodiments herein are not limited to a particular type of VR headset.

In overview, embodiments are directed to the mixing and consumption phase of VR content, although each can be considered separately.

The mixing stage is when the captured audio and/or video data is processed by a director (or similar creator) prior to being consumed by the user. Typically, the director may make certain changes to the captured data to create a desired user experience.

In some embodiments, the mixing stage may include applying certain fade-in effects to the audio signals captured from one or more audio sources so as to increase their volume gradually when they first appear to the user consuming the virtual space. In some embodiments, the fade-in of audio is triggered when an audio source is a 'new' audio source in the viewed sector. An audio source may be considered new if the user changes position to view a different sector of the virtual space which comprises the said source and said source was not in the previously viewed sector. The previously viewed sector may be that which immediately preceded the current viewed sector. Alternatively, or additionally, an audio source may be considered new if it moves within the virtual space and as a consequence enters a currently viewed sector.

In some embodiments, the mixing stage may include certain fade-out effects to the audio signals so as decrease their volume gradually when they leave the virtual space being viewed by the user. In some embodiments, an audio source may leave a currently viewed sector if the user changes position to view a different sector, and/or if the audio source moves out of the currently viewed sector.

The fade-in and fade-out effects applied to the audio signals may be linear or non-linear. The fade-in effects may start from zero sound (muted) and may increase to a target volume.

The target volume is a predetermined non-zero volume. The target volume may be the maximum volume at which sound from the respective audio source is to be played. In some embodiments, the target volume may be the original captured volume. In some embodiments, the target volume may be a volume set by the director during the mixing stage, and may differ from the original captured volume. For example, the target volume may be lower or higher than the original captured volume.

The fade-in effects may start from a non-zero sound. The fade-out effects may start from the original captured or target volume and decrease to zero sound or a non-zero sound.

In some embodiments, the mixing stage may include certain filtering effects to motion data corresponding to spatial movement of each audio source. This motion filtering may involve modifying the captured motion of the audio sources, which for example may include one or more of preventing, limiting and scaling the motion as the corresponding audio fade-in effects are being employed. For ease of explanation, these filtering effects may be termed motion fade-in effects. The motion fade-in effects may be applied to the relative panning movement of the audio sources when the user changes position, regardless of whether the audio source is itself moving in the overall virtual world.

For example, when a user changes their position or orientation from a previous viewed sector to a new viewed sector, a newly-appearing audio source may be moved gradually, or move more slowly, than the captured movement at the same time as its audio is being faded in.

The motion may be scaled from between a base level and 100% of its original motion during the fade-in process.

The consumption phase of VR content is when the user is viewing and/or listening to the virtual world content created during the mixing and subsequent rendering stages, e.g. when wearing a VR headset.

Referring to FIG. 1, an example of capturing VR video content is shown in relation to a real world space 1 shown in top plan view. Within the space 1 is a VR capture device 3, which may be multiple cameras or Nokia's OZO system, which captures in real-time video with a horizontal, 360 degree field-of-view. In the vertical plane, a 360 degree field-of-view may be captured to create a complete spherical world, or alternatively, a more limited angle may be used. Within this field-of-view are various audio sources 5-11, which can be any source of real-world sound, including people, singers, actors, musicians, musical instruments etc. Some audio sources, for example the first and second audio sources 5, 6 and the fourth and fifth audio sources 8, 9 may be spatially close together.

Each of the audio sources 5-11 may have an associated microphone 13 which in this case is a close-up microphone, e.g. a Lavalier microphone, or a pick-up feed which captures sound from each respective source and provides a corresponding audio signal to a VR processing system 14, the operation of which will be described below.

In some embodiments, the capture device 3 may also be used to capture audio from the audio sources 5-11 and provide a spatial audio signal to the VR processing system 14.

As well as having an associated microphone or audio feed, the audio sources 5-11 each carry a positioning tag 12 (marked "X") which may be any module capable of indicating through data its respective spatial position to the VR processing system 14. For example, the positioning tag 12 may be a high accuracy indoor positioning (HAIP) tag which works in association with one or more HAIP locators 16 within the space 1. HAIP systems use Bluetooth Low Energy (BLE) communication between the tags 12 and the one or more locators 16. For example, there may be four HAIP locators mounted on, or placed relative to, the capture device 3. A respective HAIP locator may be to the front, left, back and right of the capture device 3. Each HAIP tag 12 sends BLE signals from which the HAIP locators derive the tag, and therefore, audio source location.

In general, such direction of arrival (DoA) positioning systems are based on (i) a known location and orientation of the or each locator, and (ii) measurement of the DoA angle of the signal from the respective tag towards the locators in the locators' local co-ordinate system. Based on the location and angle information from one or more locators, the position of the tag may be calculated using geometry.

The VR processing system 14 is a processing system having an associated user interface (UI) 15 which will be explained in further detail below. As shown in FIG. 1, it receives as input from the capture device 3 spatial audio and video data and the position of the capture device through a signal line 17. The VR processing system 14 also receives as input from each of the audio sources 5-11 audio data and positioning data through separate signal lines 18, 19 respectively.

The VR processing system 14 in overview is used in the mixing and rendering of VR video and audio data for output to a user device 20, such as a VR headset 20 with video and audio output.

The received audio data is received as audio objects: that is, each sound source is a separate audio track. The input may be in the multi microphone signal format, such as the raw eight signal input from the OZO VR camera, if used for the capture device 3.

Figure 2:
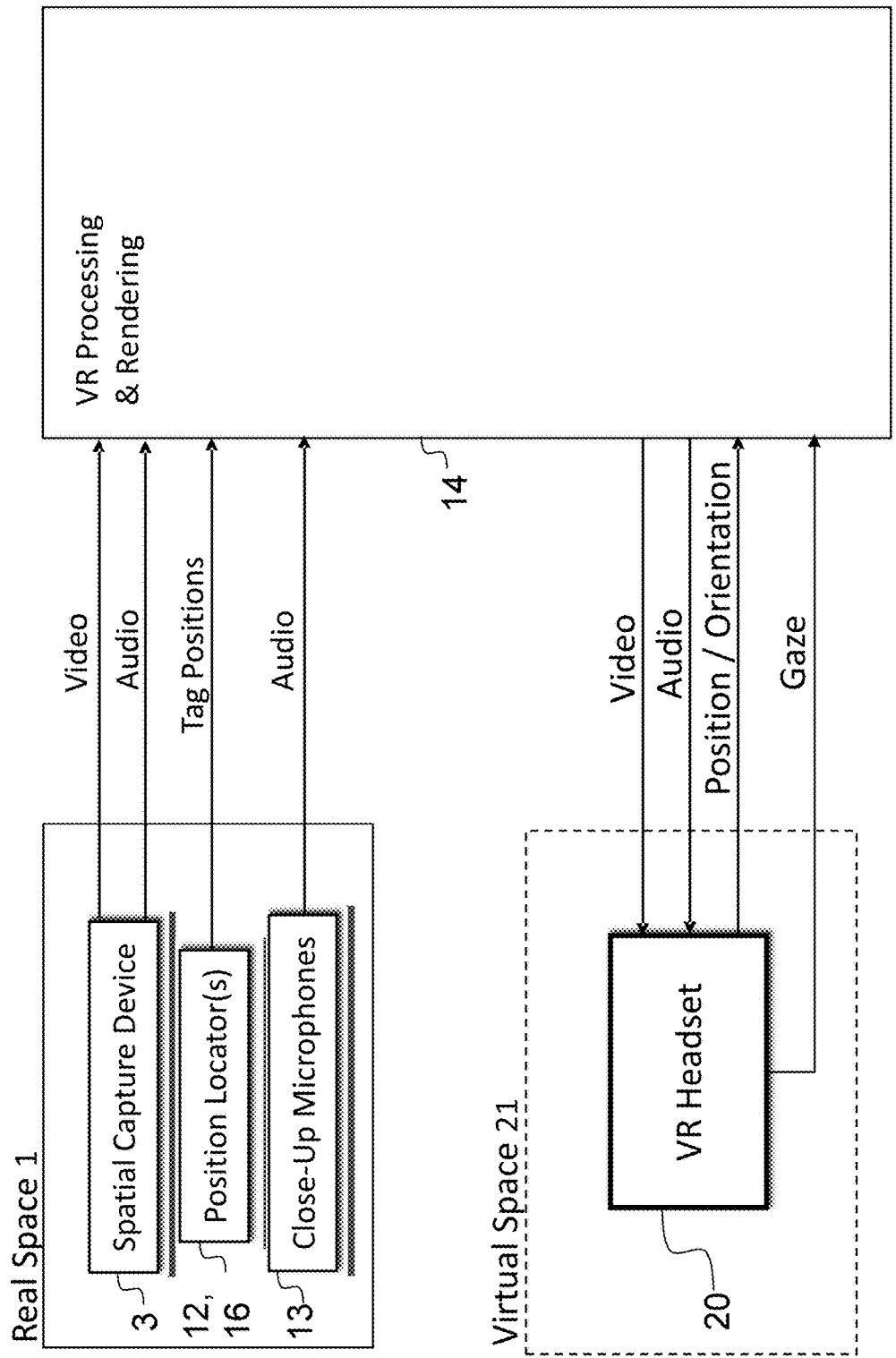
FIG. 2 is a schematic diagram illustrating components of a virtual reality system in relation to capture and playback devices.

Referring to FIG. 2, the VR processing system 14 is shown in relation to the capture device 3 for generating a virtual world or virtual space 21 displayed in computer-generated form within the VR headset 20. The VR processing system 14 receives from the capture device 3 video and audio data and generates the virtual space 21 in data form ready for display to the VR headset 20.

In use, the VR processing system 14 receives from the VR headset 20 position data, and responsive thereto delivers to the headset video and audio data corresponding to a limited spatial field-of-view of the virtual space 21 which the user is currently looking at.

The field-of-view, sometimes called the field-of-vision, is the extent of the observable virtual world that is seen or presented in the display means of the VR headset 20 at any given moment. In the context of the embodiments herein, wherein the virtual world is in a circular space, we use the term 'sector' for convenience to describe the field-of-view.

Thus, a sector may refer to any sub-portion of the available spatial field, in this case less than 360 degrees and more likely to be in the order of 70-100 degrees in the horizontal plane. A sector is indicative of the user's field-of-view, or field-of-interest, to put it another way. As the user changes position, a different sector of the available spatial field is delivered in real time or near real time. The different sector may overlap with a previous sector.

Reference to position and position data refers to any parameter indicative of user positioning and/or orientation within the virtual space 21 which can be used to determine what sector the user views at a particular point in time. Position can include the spatial position within the virtual space 21, for example in terms of Cartesian or polar co-ordinates or distance from a reference position. Position can also be indicative of orientation of the headset in terms of horizontal and/or vertical direction relative to a reference direction, e.g. 10 degrees from a reference direction.

For example, a gyroscope is an example of a motion tracking sensor within the VR headset 20 which can detect orientation based on a measured change in direction from a reference position.

In general, the position can be deduced based on signals received from motion tracking sensors on the VR headset 20, which will typically incorporate one or more of gyroscopes, accelerometers and/or structured light systems. In other embodiments, optical, electromagnetic and/or audio tracking sensors can also be used. In other embodiments, position can be determined by sensors external to the VR headset 20, for example one or more cameras directed at a user carrying markers.

Additionally, or alternatively, the spatial position can be determined by the user carrying a positioning tag (not shown) which may directly or indirectly deliver data indicative of the user position to the VR processing system 14. The positioning tag may be a High Accuracy Indoor Positioning (HAIP) tag which works in association with one or more HAIP locators, as already mentioned.

In addition, the VR processing system 14 may also take into account data indicating the current gaze direction or focus area of the user, which can be received from the VR headset 20 using eye tracking technology. Eye tracking technology may employ cameras mounted on the inside of the VR headset 20 which are directed towards the user's eyes and measure changes in direction from a reference position, which is usually set when the eyes are looking directly ahead.

Figure 3:
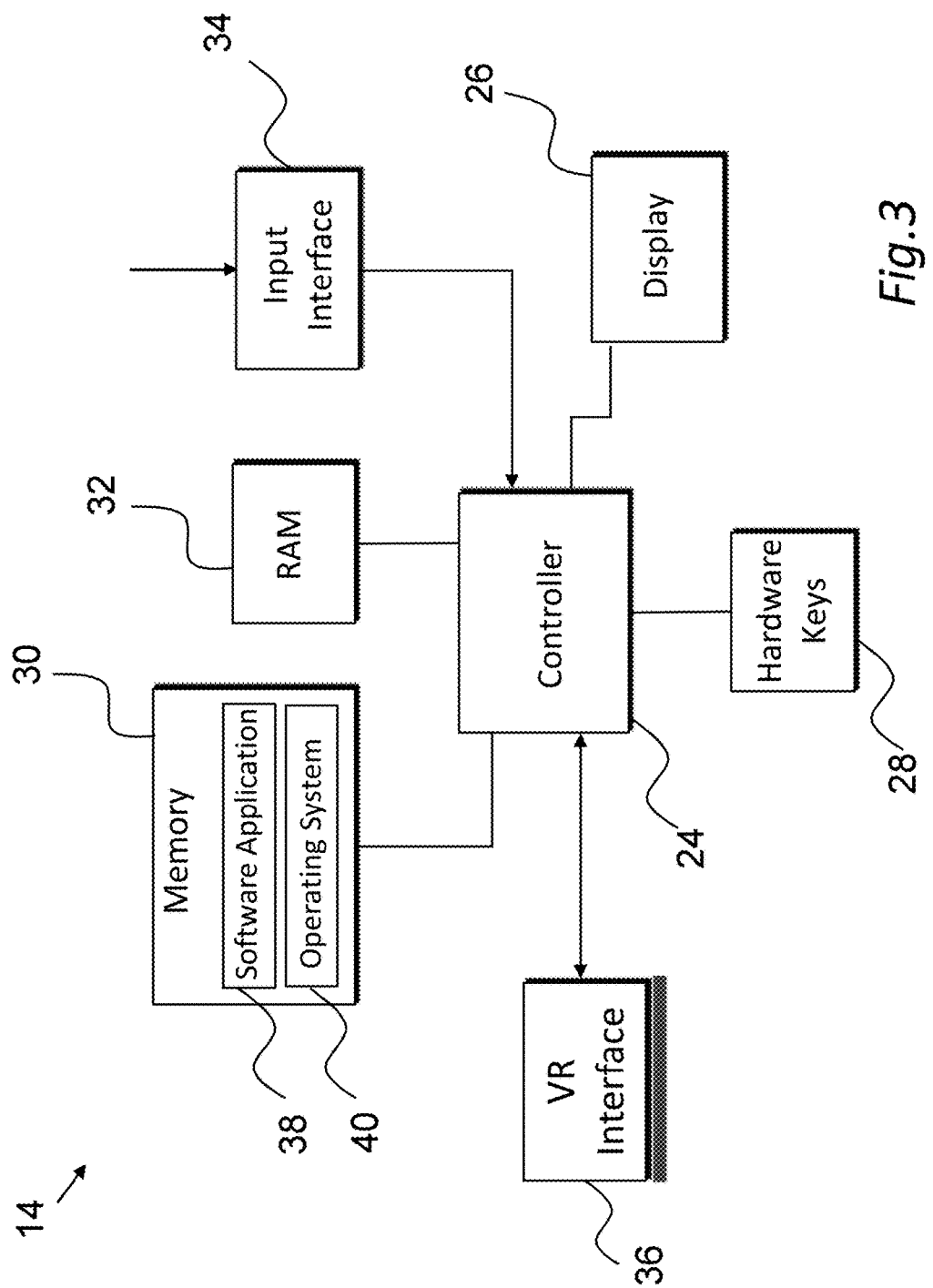
FIG. 3 is a schematic diagram showing components of a the virtual reality system in accordance with embodiments.

FIG. 3 shows an example schematic diagram of components of the VR processing system 14. The VR processing system 14 has a controller 24, a display 26, which may be touch sensitive display, hardware keys 28, a memory 30, RAM 32, an input interface 34 and a VR interface 36. The controller 24 is connected to each of the other components in order to control operation thereof.

The memory 30 may be a non-volatile memory such as read only memory (ROM) a hard disk drive (HDD) or a solid state drive (SSD). The memory 30 stores, amongst other things, an operating system 40 and one or more software applications 38. The RAM 32 is used by the controller 24 for the temporary storage of data. The operating system 40 may contain code which, when executed by the controller 24 in conjunction with RAM 32, controls operation of each of hardware components of the terminal.

The controller 24 may take any suitable form. For instance, it may be a microcontroller, plural microcontrollers, a processor, or plural processors.

The input interface 34 is configured for receiving the video, audio and positional signals from the capture device 3, position tags/locators 12, 16 and the microphones 13. The interface to the input interface 34 can be wired or wireless, or a combination of both. The input interface 34 may receive signals from other data sources, and in some embodiments, may be used for outputting data also.

The VR interface 36 is configured for transmitting and receiving signals with the VR headset 20 as shown in FIG. 2. The VR interface 36 can similarly use wired or wireless communications.

The display 26 may be configured to display the user interface 15 shown in FIG. 1 and the hardware keys 28 for interacting with the user interface. Other peripherals such as a mouse, trackball etc. may also be used for this purpose.

The software application 40 may be configured to provide the mixing capability described above, received though the user interface 15, to set certain audio and, in some embodiments, video fade-in and fade-out effects to captured content.

The software application 40 may also be configured responsive to the detected user position during the consumption phase to apply the mixed content when delivering the virtual world or space 21 to the user through the headset 20. Separate software applications can be used for the respective mixing and delivery processes.

Figure 4:
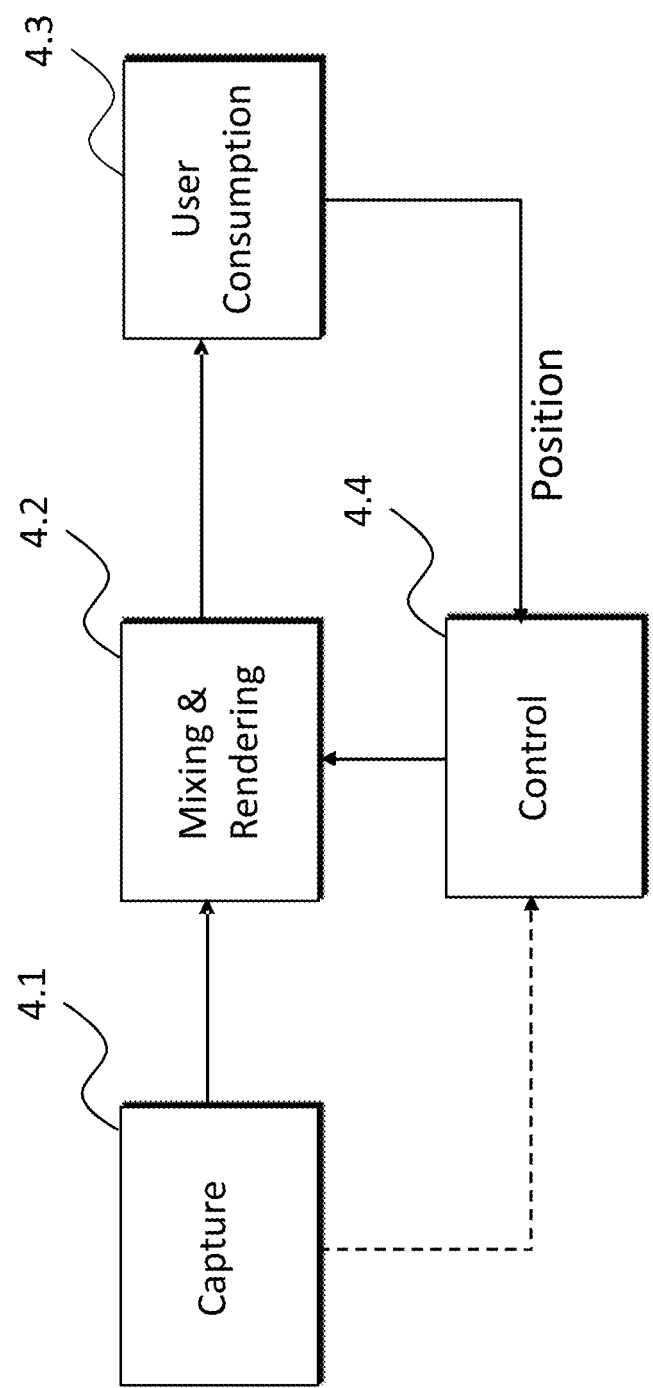
FIG. 4 is a flow diagram showing method steps of audio capture, mixing, rendering and consumption, according to embodiments.

FIG. 4 shows an overview flow diagram of the capture, mixing/rendering, user consumption and control stages of the software application 40. The mixing and rendering stages may be combined or may be separate.

First, video and audio capture is performed in step 4.1; next mixing and rendering is performed in step 4.2, followed by consumption of the mixed and rendered VR world or space 21 in step 4.3. The mixing and rendering stage 4.3 may be controlled in a control stage 4.4 which may be dependent on feedback data indicating user position received during the user consumption stage 4.3.

Embodiments of how the mixing/rendering stage 4.3 may be performed using the software application 38 will now be described.

In overview, profiles are associated with respective ones of the audio sources 5-11, which profiles are applied by the software application 38 during the control stage 4.4 based on user position.

Figure 5:
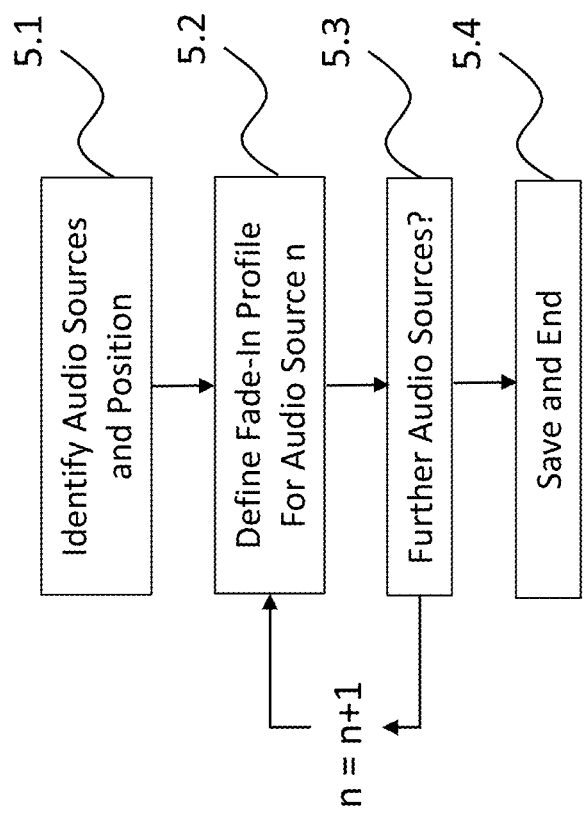
FIG. 5 is a flow diagram showing method steps of defining audio fade-in profiles for audio sources, according to embodiments.

Referring to FIG. 5, a generalised method for creating one or more audio fade-in profiles is shown. A first step 5.1 comprises identifying the audio sources 5-11 and their spatial positions. A second step 5.2 comprises defining for a first one of the audio sources 5-11 an audio fade-in profile. In a subsequent step 5.3 it is determined if the further audio sources 6-11 require a fade-in audio profile. If so, the process repeats from step 5.2. If not, the process ends in step 5.4 and the profiles are saved.

In some embodiments, an audio fade-in profile is a data representation of volume as an increasing function of a finite time period, i.e. the fade-in period. The maximum volume may be 100% of the captured volume, meaning that the fade-in profile will increase from a level well below 100% and gradually increase with time so that the captured volume is reached at the end of the fade-in period. In some embodiments, the maximum volume is a target volume that is set by the director during the mixing stage, and which may be different from the captured volume.

It will be understood that the term 'fade-in' in this context, and all other contexts herein, implies an appreciably gradual change which is non-immediate or sudden in auditory terms.

Figure 6:
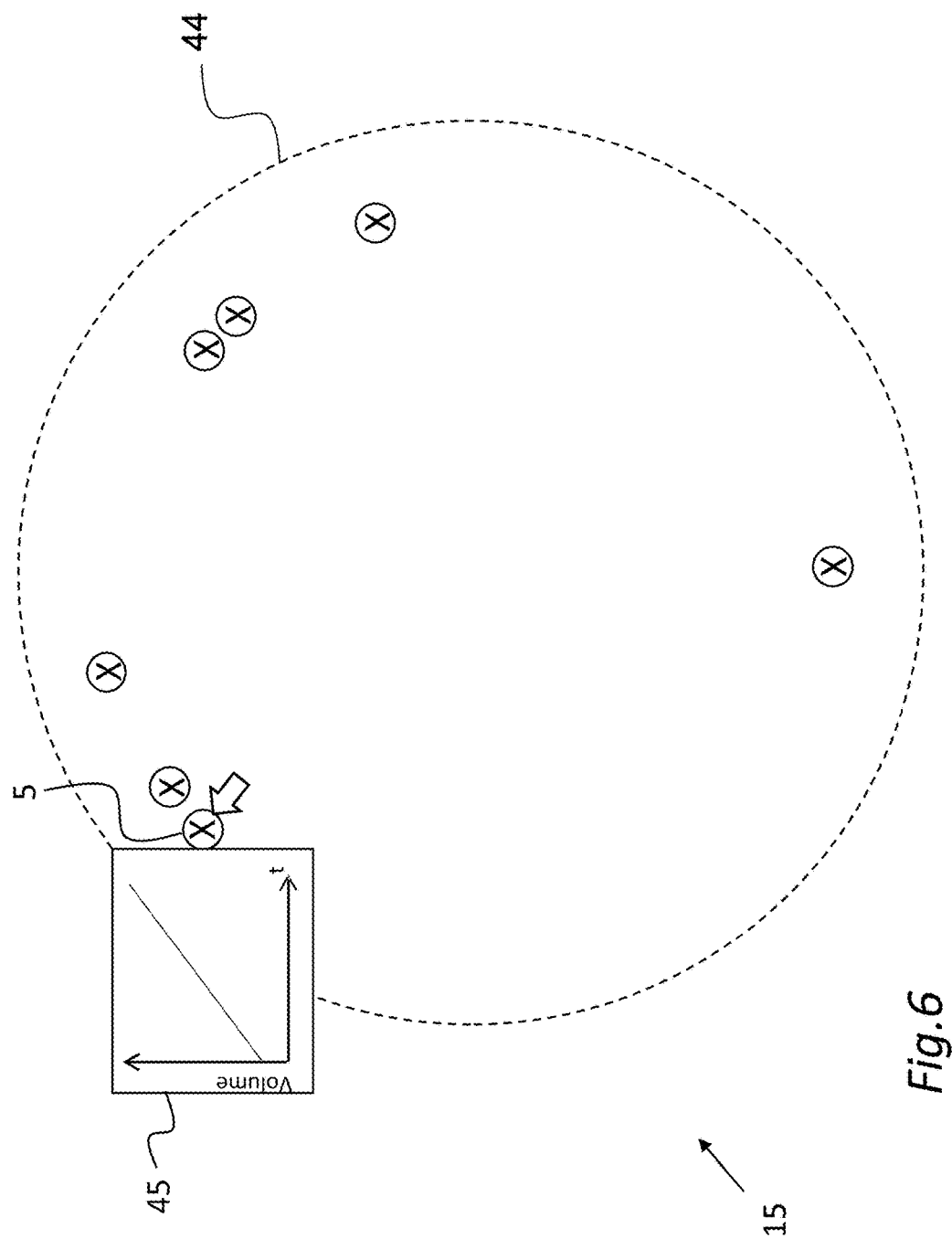
FIG. 6 is a schematic view of a user interface which shows the positions of audio sources in the FIG. 1 space and an associated audio fade-in profile, according to embodiments.

The fade-in profile can be created and/or displayed in graphical form, as shown in FIG. 6, for example.

FIG. 6 shows an example of the output of user interface 15 which is useful for understanding the FIG. 5 method. The user interface 15 initially shows in graphical form the received and captured real space 1 and includes each of the audio sources 5-11 and their respective spatial positions using a plan-view map 44. Next, for a selected one of the audio sources, for example the first audio source 5, a fade-in audio profile 45 is defined and saved. In this embodiment, this is performed graphically by first selecting the relevant audio source 5 using a mouse pointer or the like, and then either selecting one of a plurality of predetermined profiles from a pre-stored list, or alternatively by drawing the profile directly on a volume versus time graph.

In this case, the fade-in audio profile 46 is substantially linear and starts at t=0 with a non-zero volume slightly above the muted state, and increases gradually with time such that 100% of the target volume for the first audio source 5 is reached at the end of the fade-in period.

The fade-in period may be approximately 5 seconds, for example, but this may be adjusted.

Figure 7:
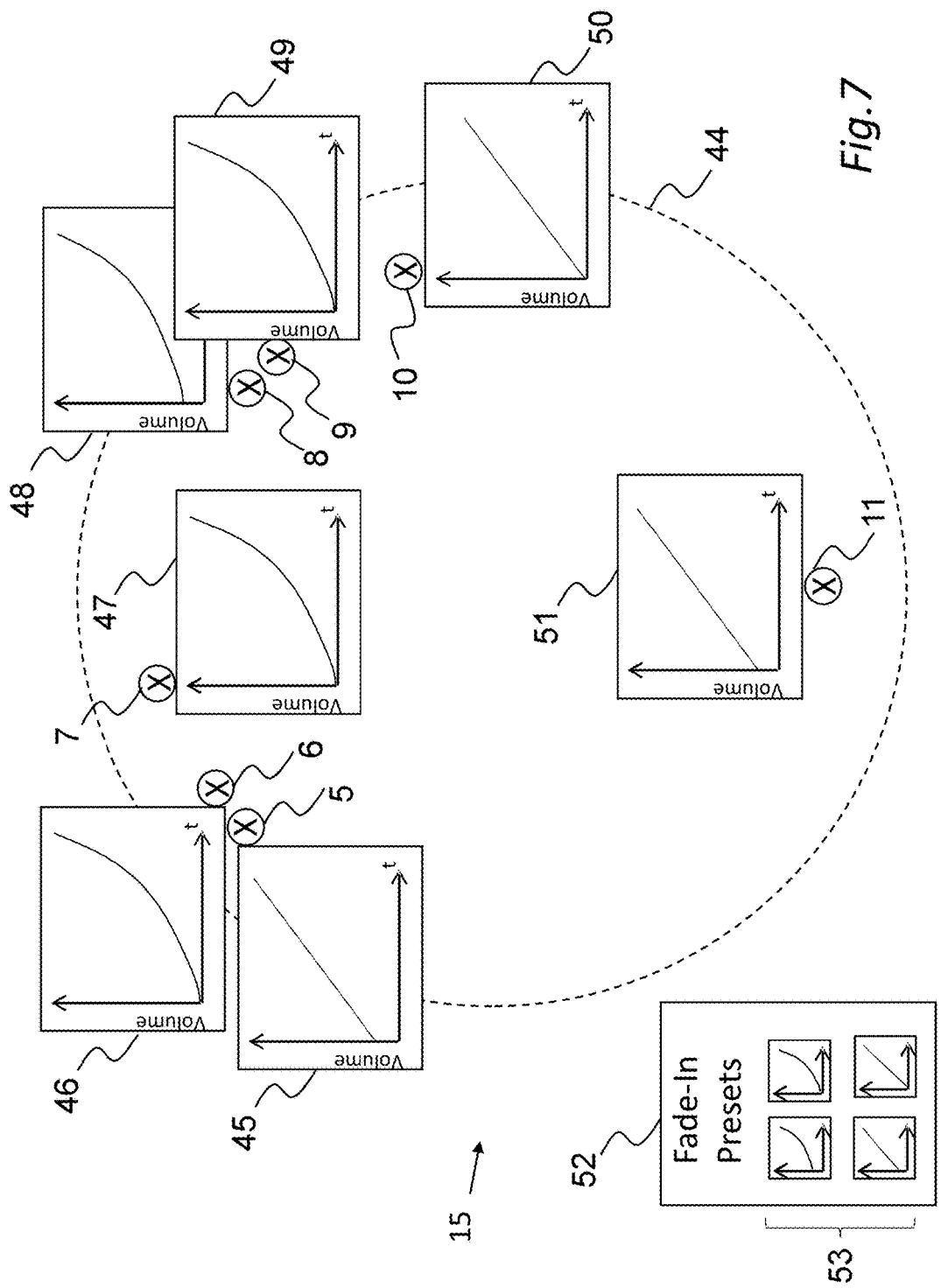
FIG. 7 is a schematic view of the FIG. 6 user interface with multiple audio sources each having an associated fade-in profile, according to embodiments.

Referring to FIG. 7, the user interface 15 is shown following selection and definition of fade-in profiles 45-51 for each of the six audio sources 5-11.

It will be understood and seen from FIG. 7 that each audio source 5-11 may have a different respective fade-in profile 45-51. For example, the second audio source 6 in this example may have a non-linear profile 46 that increases generally exponentially from a muted state to the target volume over the fade-in period. The third and fifth audio sources 7, 9 in this example have the same fade-in profiles 47, 49 as the second audio source. The fourth audio source 8 has a fade-in profile 48 that increases exponentially but from a non-muted start point. The sixth audio source 10 has a fade-in profile that is linear but which starts from a muted condition. Finally, the seventh audio source 11 has a fade-in profile 51 that is linear but starts from a non-muted condition.

Any combination of the above fade-in profiles 45-51 may be used. In some embodiments, only a selected subset of the audio sources 5-11 have a fade-in profile applied.

Selection of the above fade-in profiles 45-51 may be performed via a selection panel 52 presented by the software application 38 on the user interface 15. The selection panel 52 may present a plurality of selectable and preset profile options, each of which may be edited subsequently, for example in terms of fade-in period and rate of volume increase. For example, an edit option may allow the director to drag or push the graph line in a given direction to change its position between the start and end points.

In some embodiments, plural ones of the audio sources 5-11 may be grouped and a common fade-in profile applied to the group.

Referring to FIG. 8, the user interface 15 is shown during part of the FIG. 5 method. In this case, the first and second audio sources 5, 6 are selected as a group by dragging a box 55 around the said sources. When selected, the director may click a required profile option from the selection panel 52. In this case, the fade-in profile 46 is applied to both the first and second audio sources 5, 6.

The above grouping process may be cancelled and/or repeated for other ones of the audio sources 5-11.

Referring to FIG. 9, a generalised method for controlling the mixing and rendering is shown in flow chart form. This is performed during the user consumption phase in which the video and audio data from the virtual world or space 21 is being consumed.

A first step 9.1 comprises analysing the currently-viewed sector of the virtual space 21. As mentioned above, this comprises using the position data from the VR headset 20 to identify the currently-viewed sector based on an assumed viewing angle of, say, 40 degrees about the central head direction. The currently-viewed sector may, alternatively or additionally, be identified from the eye movement detection and gaze tracking. The next step 9.2 comprises identifying from the audio sources within the viewed sector any 'new' audio sources. An audio source may be considered new if the user has changed position from a previous sector to the new sector and the audio source was not within the previous sector. The previously viewed sector may be that which immediately preceded the currently-viewed sector. Alternatively, or additionally, an audio source may be considered new if it moves within the virtual space and as a consequence enters a currently-viewed sector. The next step 9.3 comprises the software application 38 applying the fade-in profiles for the 'new' audio sources so that their sound is faded-in appropriately.

The process is repeated from step 9.1 for subsequent time frames and/or when a change in user position is detected to provide a new sector.

The software application 38 applies the fade-in profiles for the 'new' audio sources so that their sound is faded-in appropriately when it is detected that the one or more new audio sources are within the current field-of-view. More generally, the software application 38 applies the fade-in profiles for the 'new' audio sources so that their sound is faded-in appropriately when it is detected that the one or more new audio sources have a predetermined relationship with respect to the current field-of-view. Above, the predetermined relationship is that the one or more new audio sources are within the current field-of-view. Alternatively, the predetermined relationship may be that the one or more new audio sources are more than a threshold amount, e.g. 1 degree, 2 degrees or 3 degrees) within the current field-of-view, i.e. not very close to the edge of the field-of-view. Further alternatively, the predetermined relationship may be that the one or more new audio sources are less than a threshold amount, e.g. 1 degree, 2 degrees or 3 degrees) outside the current field-of-view. With this latter alternative, the audio source may begin to be faded in if it is just outside the field-of-view, which may encourage the user to move slightly so that they have the audio course in the field-of-view. The threshold amount may depend also on the rotational velocity and/or translational velocity of the user. The threshold amount may also depend on the distance between the user and the audio source.

FIG. 10*a* shows in graphical form an example of applying the FIG. 9 steps; FIG. 10*a* shows a virtual space 60 which is a computer-generated version of the FIG. 1 space, in top plan view. A user 62 is shown within the virtual space 60 and consumes video and audio data corresponding to a sector 63 of the virtual space, received from the VR processing system 14 and based on the detected position of the VR headset 20. It is assumed that the user 62 has just rotated their position indicated by the arrow from a previously viewed sector 64. The result is that the first to third audio sources 5-7 are identified as new audio sources because they were not present in the previously-viewed sector 64. Consequently, the software application 38 is triggered to apply the fade-in profiles 45-47 corresponding to the first to third audio sources 5-7.

FIG. 10*b* shows the fade-in profiles 45-47 when overlaid to indicate the cumulative effect of the user's positional change. The sound corresponding to the first to third audio sources 5-7 fades in according to the graph lines 45'-47' respectively and reach 100% of their target volumes within a fade-in period of approximately 5 seconds.

The effect of applying the fade-in profiles 45-51 is to open-up the overall audio scene as the user changes position and looks at different sectors and audio sources within the scene. For example, the fade-in profiles 45-51 may be arranged so that when the user starts listening to object-based VR audio content, they will first hear the most prominent audio source, e.g. a lead vocalist in a band. Then, the user may look around in the virtual space 21, towards the side where other band members are located, which may cause the corresponding audio sources gradually to increase in volume without overwhelming the user. Advantageously, this may help the user understand and appreciate the audio content, particularly if plural audio sources are present. It is much easier to obtain an understanding if audio sources are gradually introduced compared with listening to all viewed sources at 100% of their captured volume simultaneously.

In other embodiments, one or more audio fade-out profiles may be provided in addition to the audio fade-in profiles.

In some embodiments, an audio fade-out profile is a data representation of volume as a decreasing function of a finite time period, i.e. the fade-out period. The initial volume may be 100% of the captured volume, or a director-specified target volume, meaning that the fade-out profile will decrease from 100% of the target volume gradually in time. The fade-out period may be different from the fade-in period.

It will be understood that the term 'fade-out' in this context, and all other contexts herein, implies an appreciably gradual change which is non-immediate or sudden in auditory terms.

The fade-out profiles can be created and/or displayed in graphical form. The fade-out profiles can be created at the same time, before, or subsequent to, the fade-in profile(s).

Referring to FIG. 11, a generalised method for creating one or more audio fade-out profiles is shown. A first step 11.1 comprises identifying the audio sources 5-11 and their spatial positions. A second step 11.2 comprises defining for a first one of the audio sources 5-11 an audio fade-out profile. In a subsequent step 11.3 it is determined if the further audio sources 6-11 require a fade-out audio profile. If so, the process repeats from step 11.2. If not, the process ends in step 11.4 and the profiles are saved.

Figure 12:
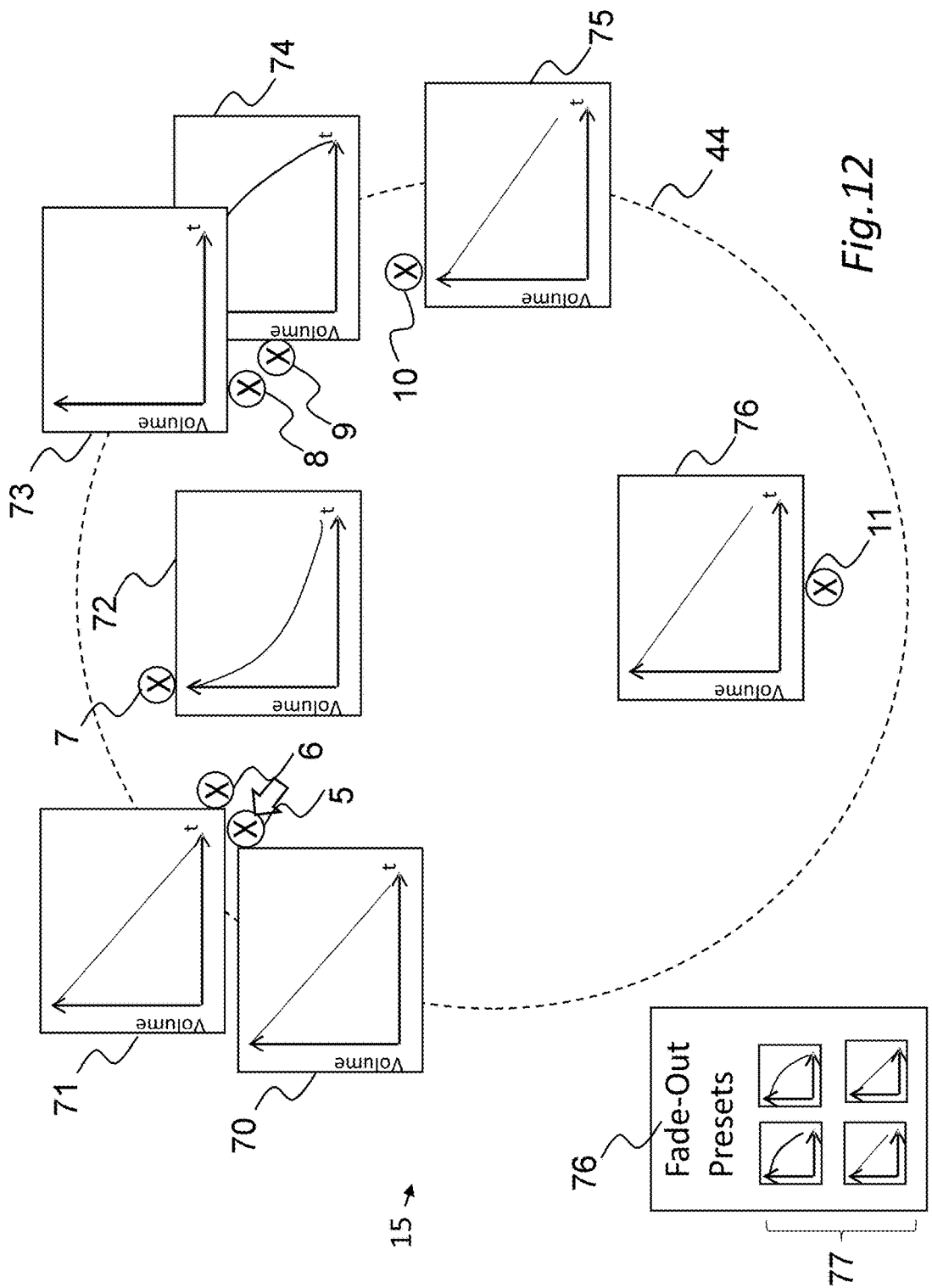
FIG. 12 is a schematic view of the FIG. 6 user interface with multiple audio sources each having an associated fade-out profile, according to embodiments.

Referring to FIG. 12, the user interface 15 is shown following selection and definition of fade-out profiles 70-76 for each of the six audio sources 5-11. Selection and definition may follow the same method as for defining the fade-in profiles 46-51 and may be performed directly through the user interface 15.

Each audio source 5-11 may have a different respective fade-out profile 70-76. For example, the first and second audio sources 5, 6 may have a linear fade-out profile. The third audio source 7 in this example may have a non-linear fade-out profile 72 that decays generally exponentially to a non-muted state over the fade-out period. The fourth and fifth audio sources 8, 9 in this example have the same, non-linear fade-out profiles 73, 74. The sixth and seventh audio sources 10, 11 profiles have a fade-out profile 75, 76 that is linear and decreases to a non-muted state.

Any combination of the above fade-out profiles 70-76 can be used. In some embodiments, only a selected subset of the audio sources 5-11 have a fade-out profile applied.

Selection of the above fade-out profiles 70-76 may be performed via a selection panel 76 presented by the software application 38 on the user interface 15. The selection panel 76 may present a plurality of selectable and preset profile options 77, each of which may be edited subsequently, for example in terms of fade-out period and rate of volume decrease. For example, an edit option may allow the director to drag or push the graph line in a given direction to change its position between the start and end points.

In some embodiments, plural ones of the audio sources 5-11 can be grouped and a common fade-out profile applied to the group.

In some embodiments, a global fade-out profile may be provided that is associated with all audio sources 5-11 and applied when they leave the view sector.

The software application 38 uses the fade-out profiles 70-76 in the same way as for the fade-in profiles, except that their use is triggered when the corresponding audio source 5-11 leaves the current viewed sector.

Figure 13:
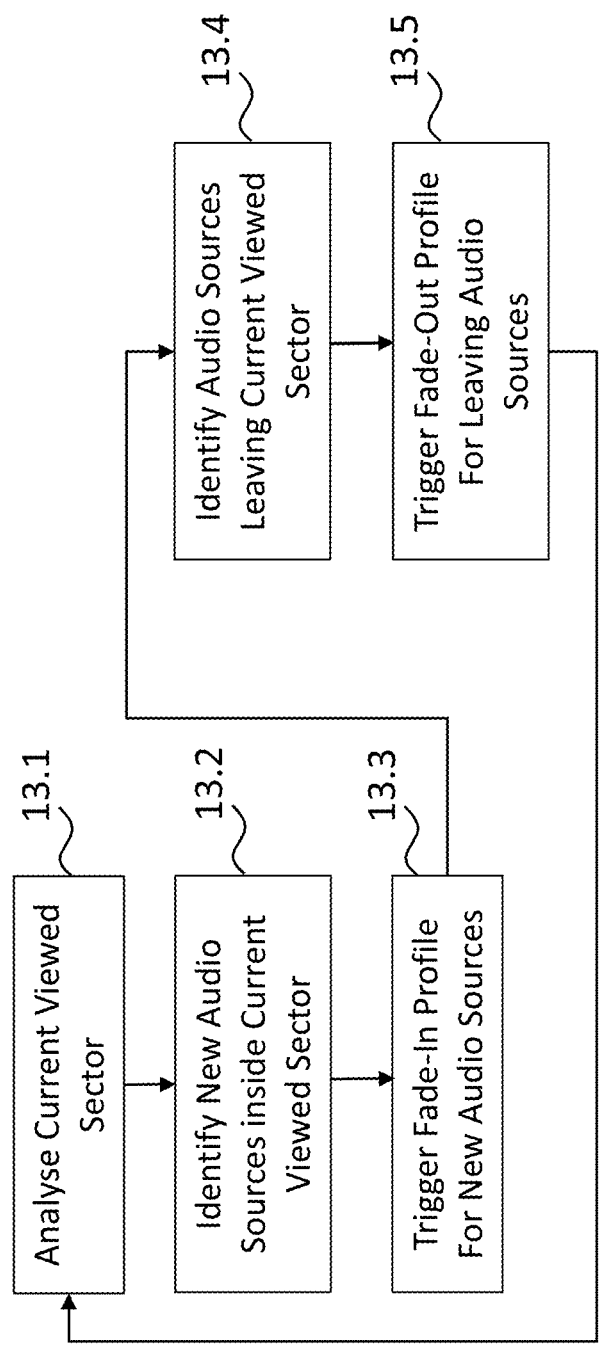
FIG. 13 is a flow diagram showing method steps of applying fade-in and fade out profiles for audio sources responsive to user movement, according to embodiments.

Referring to FIG. 13, a generalised method for controlling the mixing and rendering is shown in flow chart form in the case where both fade-in and fade-out profiles are applied. This is performed during the user consumption phase in which the video and audio data from the virtual world or space 21 is being consumed.

A first step 13.1 comprises analysing the currently-viewed sector of the virtual space 21. As mentioned above, this comprises using the position data from the VR headset 20 to identify the currently-viewed sector. The next step 13.2 comprises identifying from the audio sources within the viewed sector any 'new' audio sources. An audio source may be considered new if the user has changed position from a previous sector to the new sector and the audio source was not within the previous sector. The previously viewed sector may be that which immediately preceded the currently-viewed sector. Alternatively, or additionally, an audio source may be considered new if it moves within the virtual space and as a consequence enters a currently-viewed sector. The next step 13.3 comprises the software application 38 applying the fade-in profiles for the 'new' audio sources so that their sound is faded-in appropriately. The next step 13.4 comprises identifying audio sources that have left or disappeared. Responsive to this, step 13.5 comprises triggering the fade-out profiles for the audio sources identified in step 13.4.

The process is repeated from step 13.1 for subsequent time frames and/or when a change in user position is detected. Steps 13.2-13.3 and 13.4-13.5 may be performed simultaneously.

FIG. 14a shows in graphical form an example of applying the FIG. 13 steps; FIG. 14a shows a virtual space 80 which is a computer-generated version of the FIG. 1 space, in top plan view. A user 62 is shown within the virtual space 80 and consumes video and audio data corresponding to a sector 65 of the virtual space, received from the VR processing system 14 and based on the detected position of the VR headset 20. It is assumed that the user 62 has just rotated their position indicated by the arrow from a previously viewed sector 64. The result of the user 62 changing their position in this way is that (a) the fourth and fifth audio sources 8, 9 are new audio sources, and hence their fade-in profiles are applied, and (b) the previously-viewed first to third audio sources 5-7 are no longer viewed, and hence their fade-out profiles are applied.

Consequently, the software application 38 is triggered to apply the fade-in profiles 48, 49 and the fade-out profiles 70-72. FIG. 14b shows these profiles when overlaid to indicate the cumulative effect of the user's positional change from the previous sector 64 to the new sector 65. The sound corresponding to the first to third audio sources 5-7 fades out according to the graph lines 70'-72' respectively and the sound corresponding to the fourth and fifth audio sources 8, 9 fades in according to the graph lines 48', 49'.

By applying fade-out profiles in addition to fade-in profiles, the user is not overwhelmed by sounds in what may be complex overall scene with many audio sources. Only those in the current field-of-view sector are faded-in and then played at the appropriate volume.

In some embodiments, one or more filtering profiles may be applied to the audio sources 5-11 in terms of their spatial movement. That is, movement data which corresponds to movement of the audio sources 5-11 relative to the field-of-view may be modified by the software application 38 to control how movement of said sources is rendered to the user via the VR headset 20. This may be employed during rotational panning motion when the user changes the view sector, e.g. from sector 64 to sector 65 as shown in FIG. 14a.

Figure 15:
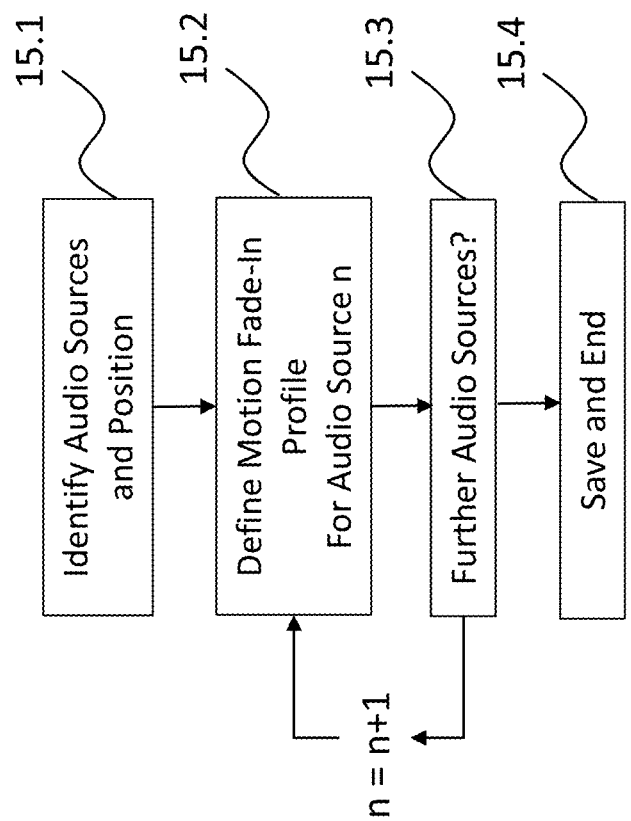
FIG. 15 is a flow diagram showing method steps of defining video fade-in profiles for audio sources, according to embodiments.

Thus, a movement or motion fade-in profile may be defined, saved and applied to each audio source 5-11 using a method as shown in the flow chart of FIG. 15. A first step 15.1 comprises identifying the audio sources 5-11 and their spatial positions. A second step 15.2 comprises defining for a first one of the audio sources 5-11 a motion fade-in profile. In a subsequent step 15.3 it is determined if the further audio sources 6-11 require a motion fade-in profile. If so, the process repeats from step 15.2. If not, the process ends in step 15.4 and the profiles are saved.

In some embodiments, a motion fade-in profile is a data representation of movement scale as an increasing function of a finite time period, i.e. the fade-in period, which may be the same as the audio fade-in period, or different. The maximum movement scale may be 100%. The minimum movement scale may be zero, i.e. whereby movement is locked, at least initially, or it may be non-zero. In some situations, it may be desirable to lock the audio source to a fixed position before it is faded-in fully.

Figure 16:
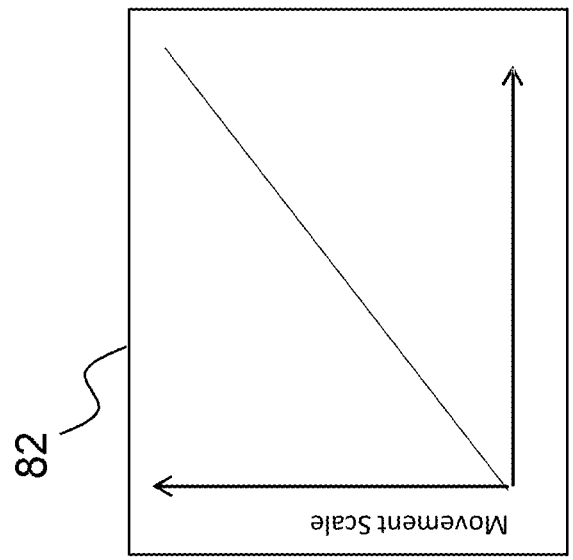
FIG. 16 is graphical view of an example video fade-in profile, according to embodiments.

FIG. 16 shows an example motion fade-in profile 82 which determines how movement, e.g. panning movement, of the corresponding audio source 5-11 is rendered through the VR headset 20. The motion fade-in profile 82 is in this case linear. Thus, when the user pans to a view sector, a new audio source 5-11 entering the scene will initially move very slowly and then increase gradually their movement to 100% in a linear way.

Application of the motion fade-in profiles may be triggered at the same time as the audio fade-in profiles. Thus, when one or more new audio sources 5-11 are detected within a user's view sector, both their audio and motion fade-in profiles will be triggered by the application program 40 so that both sound fading-in and movement scaling will be applied.

The above embodiments are described in relation to using close-up microphones 13 with the audio sources 5-11, i.e. object audio sources. Having the sources as audio objects (an audio object comprises the audio data and time-varying position data) facilitates the fading-in/out of audio sources. After applying the gain, the audio objects are panned to the loudspeaker domain using Vector Base Amplitude Panning (VBAP), or binaurally rendered using head-related transfer function (HRTF) filtering. In some embodiments, once the entire spatial field (360 degrees) or a predetermined proportion of the spatial field (e.g. 180 degrees) has been viewed, and the present audio sources faded-in, then the spatial audio, e.g. captured by an OZO device, may also be faded in by the VR processing system 14. In more detail, and specifically in relation to an OZO device, gains are to audio objects (fade-in/out), then upmixing to loudspeaker domain is performed using VBAP gains. Then, conversion to the 8-channel OZO microphone to the same loudspeaker domain is performed. Then, the fade in gain is applied to the loudspeaker domain OZO audio, before it is mixed with the loudspeaker domain upmixed objects and the loudspeaker domain OZO audio. Similarly, in the binaural domain: gains are applied to audio objects, then audio objects are rendered to the binaural domain, then OZO audio is converted to binaural domain and gain is applied, and mixing of objects and OZO audio in binaural domain is performed.

In some embodiments, the above-described fade-out profiles need not be used, and the full audio scene may be opened-up by the user looking in all directions to apply the fade-ins.

In some embodiments, all audio sources 5-11 are audible but relatively very quiet when the user enters the scene.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
   associating each of a plurality of spatially-distributed audio sources in a virtual space with a respective separate fade-in profile, each of the plurality of audio sources providing one or more audio signals representing audio for playback through a user device, where each of the plurality of respective separate fade-in profiles defines how audio volume for each of the plurality of audio sources is respectively gradually increased from a minimum level to a target volume level as a function of time;
   identifying, based on user position, a current field-of-view within the virtual space; and
   responsive to detecting that one or more new audio sources of the plurality of spatially-distributed audio sources in the virtual space have a predetermined relationship with respect to the current field-of-view, fading-in the audio from the or each new audio source according to the respective separate fade-in profile for each of the respective one or more new audio sources so as to increase its audio volume gradually towards the target volume level defined with the one or more respective separate fade-in profiles.

2. The method of claim 1, wherein the one or more new audio sources are detected responsive to the current field-of-view changing due to a change in the user position from a previous field-of-view with respect to which the one or more new audio sources did not have a predetermined relationship.

3. The method of claim 1, wherein the one or more new audio sources are detected responsive to them moving within the virtual space from outside to inside the current field-of-view.

4. The method of claim 1, wherein each of the one or more respective separate fade-in profiles defines how the audio volume for the one or more new audio sources is respectively gradually increased from between the minimum level and the target volume level as a function of time.

5. The method of claim 4, wherein one or more of the one or more respective separate fade-in profiles defines a non-zero minimum level.

6. The method of claim 4, wherein one or more of the one or more respective separate fade-in profiles defines a non-linear rate of increase between the minimum level and the target volume level.

7. The method of claim 4, wherein the plurality of audio sources provided in the virtual space are each associated with a different respective separate fade-in profile, and wherein one or more groups each comprising plural audio sources of the plurality of audio sources are provided in the virtual space, wherein the plural audio sources within a group are also associated with a common fade-in profile associated therewith.

8. The method of claim 1, further comprising fading-out the audio from the one or more new audio sources so as to decrease their audio volume responsive to detecting said one or more new audio sources leaving the current field-of-view.

9. The method of claim 2, further comprising:
   defining a respective separate motion fade-in profile for each of the one or more new audio sources in the current field-of-view, where each of the one or more respective separate motion fade-in profiles defines how spatial movement for each of the one or more new audio sources is modified as a function of the current field-of-view change, said respective separate motion fade-in profile being used together with the corresponding respective separate fade-in profile to determine how the audio volume for each of the one or more new audio sources is respectively increased from between the minimum level and the target volume level as a function of time.

10. An apparatus comprising at least one processor and at least one non-transitory memory having computer-readable code stored thereon which when executed controls the at least one processor to perform:
    associate each of a plurality of spatially-distributed audio sources in a virtual space with a respective separate fade-in profile, each of the plurality of audio sources providing one or more audio signals representing audio for playback through a user device, where each of the plurality of respective separate fade-in profiles defines how audio volume for each of the plurality of audio sources is respectively gradually increased from a minimum level to a target volume level as a function of time;
    identify, based on user position, a current field-of-view within the virtual space; and
    responsive to detecting that one or more new audio sources of the plurality of spatially-distributed audio sources in the virtual space have a predetermined relationship with respect to the current field-of-view, fade-in the audio from the or each new audio source according to the respective separate fade-in profile for each of the respective one or more new audio sources so as to increase its audio volume gradually towards the target volume level defined with the one or more respective separate fade-in profiles.

11. The apparatus of claim 10, wherein the one or more new audio sources are detected responsive to the current field-of-view changing due to a change in the user position from a previous field-of-view with respect to which the one or more new audio sources did not have a predetermined relationship.

12. The apparatus of claim 10, wherein the one or more new audio sources are detected responsive to them moving within the virtual space from outside to inside the current field-of-view.

13. The apparatus of claim 10, wherein one or more of the one or more respective separate fade-in profiles defines a non-zero minimum level.

14. The apparatus of claim 10, wherein one or more of the one or more respective separate fade-in profiles defines a non-linear rate of increase between the minimum level and the target volume level.

15. The apparatus of claim 10, wherein the plurality of audio sources provided in the virtual space are each associated with a different respective separate fade-in profile, and wherein one or more groups each comprising plural audio sources of the plurality of audio sources are provided in the virtual space, wherein the plural audio sources within a group are also associated with a common fade-in profile associated therewith.

16. The apparatus of claim 10, further comprising fading-out the audio from the one or more new audio sources so as to decrease their audio volume responsive to detecting said one or more new audio sources leaving the current field-of-view.

17. The apparatus of claim 16, wherein fading-out is performed using a predetermined fade-out profile associated with the or each respective new audio source, where each of the one or more respective separate fade-out profiles defines how the audio volume for each of the one or more new audio sources is decreased from between a first level and a minimum volume level as a function of time.

18. A computer program embodied on a non-transitory computer-readable storage medium storing computer-readable code, which, when executed with at least one processor, causes the at least one processor to perform:
associate each of a plurality of spatially-distributed audio sources in a virtual space with a respective separate fade-in profile, each of the plurality of audio sources providing one or more audio signals representing audio for playback through a user device, where each of the plurality of respective separate fade-in profiles defines how audio volume for each of the plurality of audio sources is respectively gradually increased from a minimum level to a target volume level as a function of time;
identify, based on user position, a current field-of-view within the virtual space; and
responsive to detecting that one or more new audio sources of the plurality of spatially-distributed audio sources in the virtual space have a predetermined relationship with respect to the current field-of-view, fade-in the audio from the or each new audio source according to the respective separate fade-in profile for each of the respective one or more new audio sources so as to increase its audio volume gradually towards the target volume level defined with the plurality of respective separate fade-in profiles.

* * * * *